Sept. 9, 1924.

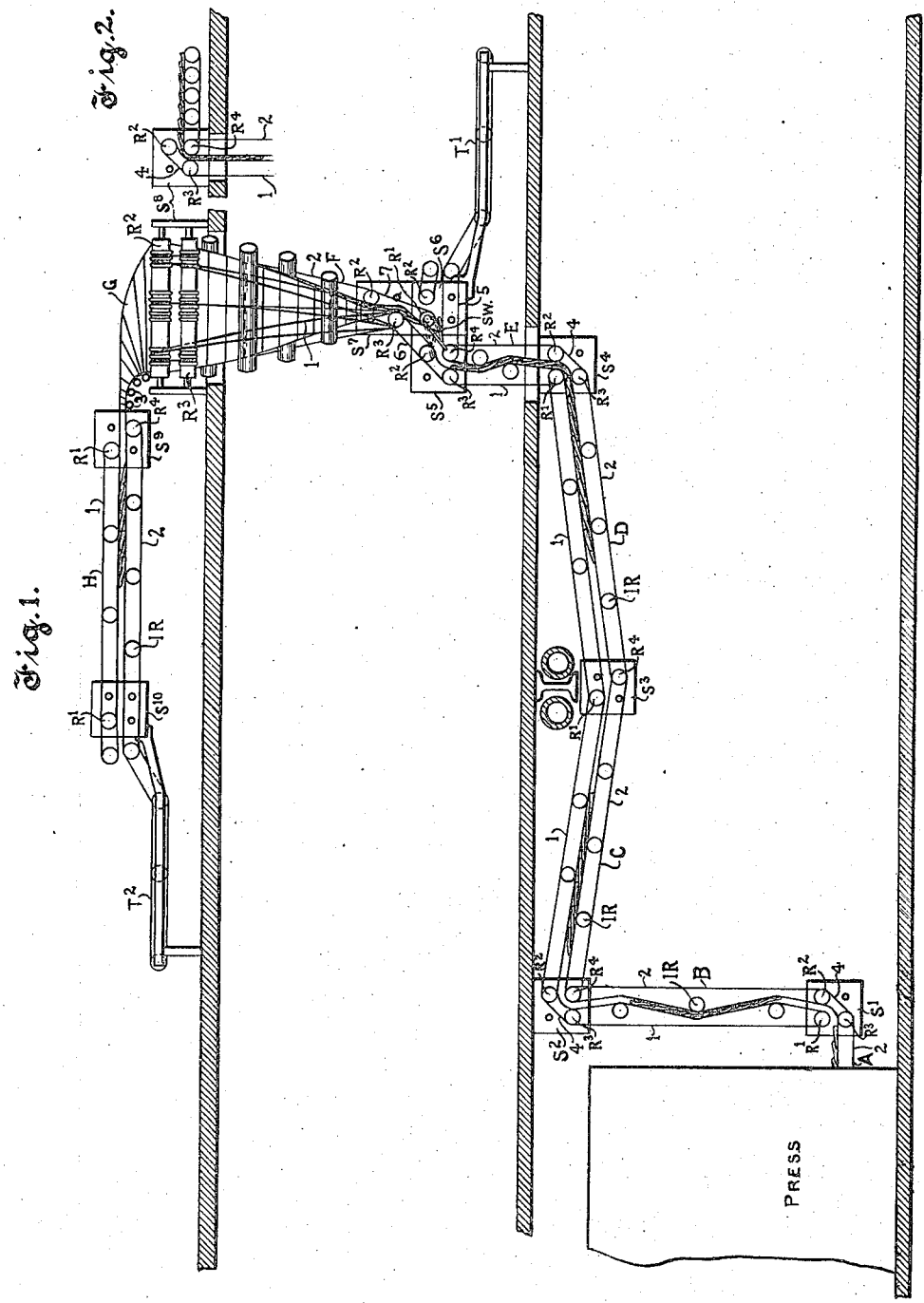

G. B. REISBACH ET AL 1,508,351

BELT CONVEYER

Filed May 2, 1921   5 Sheets-Sheet 2

INVENTORS
Gustave B. Reisbach
Harry A. Sedgwick

By Frank H. Hubbard
ATTORNEY

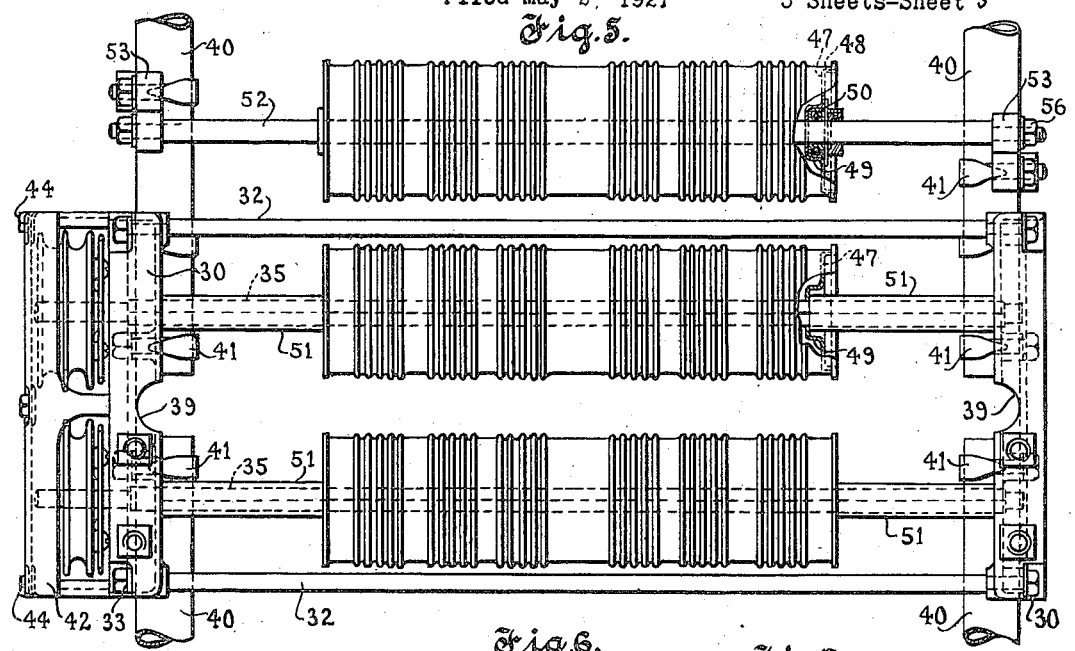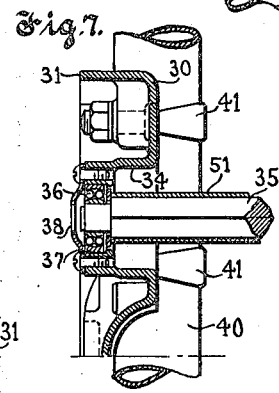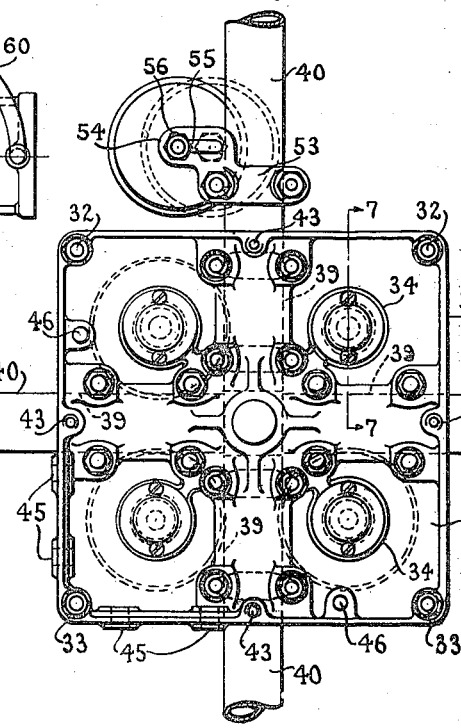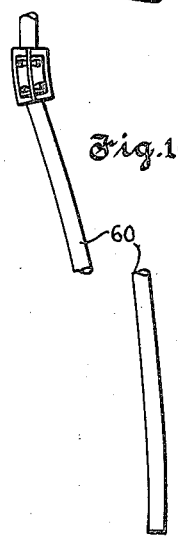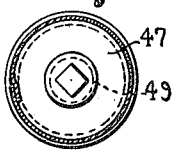

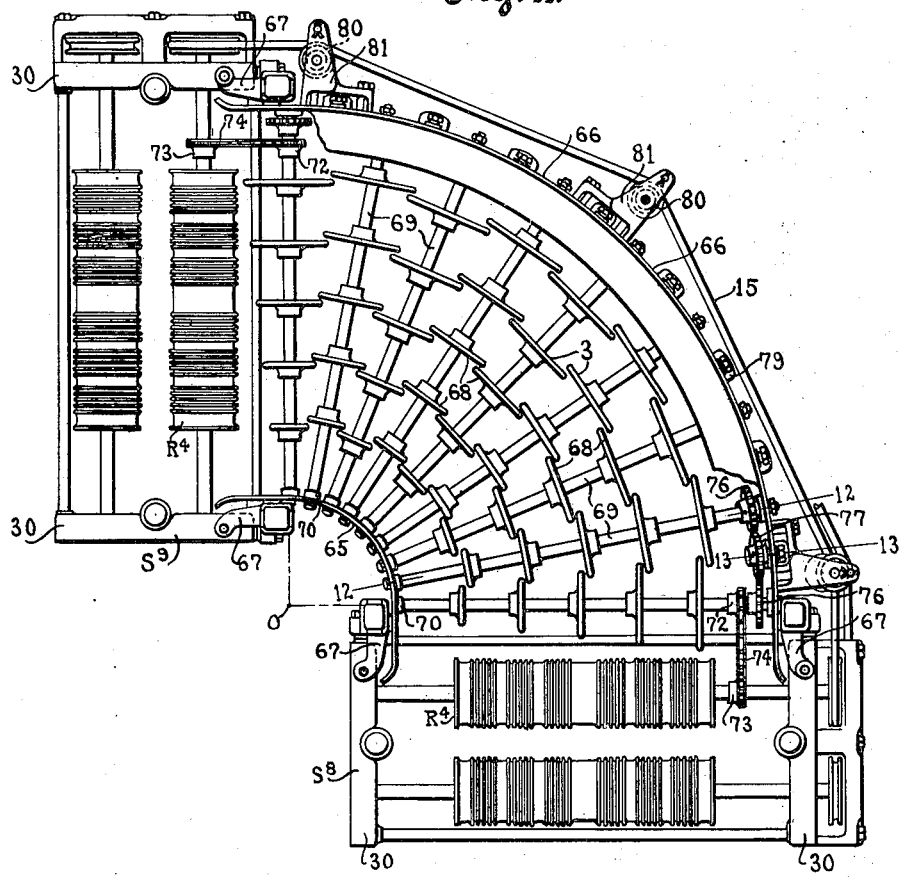

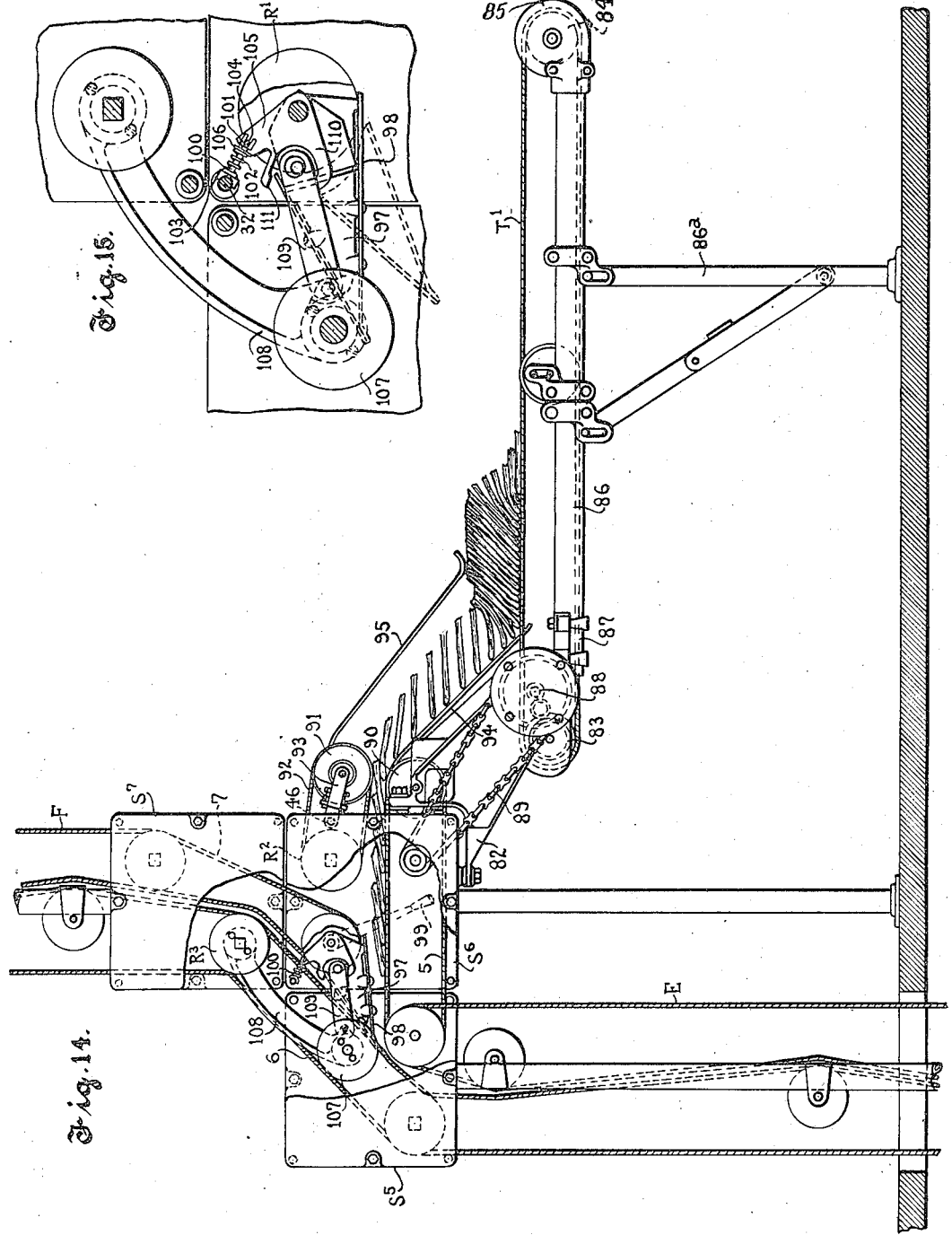

Patented Sept. 9, 1924.

1,508,351

UNITED STATES PATENT OFFICE.

GUSTAVE B. REISBACH AND HARRY A. SEDGWICK, OF MILWAUKEE, WISCONSIN, ASSIGNORS TO THE CUTLER-HAMMER MFG. CO., OF MILWAUKEE, WISCONSIN, A CORPORATION OF WISCONSIN.

BELT CONVEYER.

Application filed May 2, 1921. Serial No. 465,977.

*To all whom it may concern:*

Be it known that we, GUSTAVE B. REISBACH and HARRY A. SEDGWICK, citizens of the United States, residing at Milwaukee, in the county of Milwaukee and State of Wisconsin, have invented new and useful Improvements in Belt Conveyers, of which the following is a full, clear, concise, and exact description, reference being had to the accompanying drawing, forming a part of this specification.

This invention relates to belt conveyers and while not limited thereto it is particularly applicable to newspaper conveyers.

In practice it has been found that such conveyers must be exceedingly flexible in order to meet the requirements of different installations and heretofore procurement of the desired flexibility has necessitated use of many special parts and has moreover presented difficult problems as regards drive of the conveyer sections.

The present invention has among its objects to obviate the necessity for many of the special parts heretofore required and to simplify the drive of the several conveyer sections.

Another object is to provide such a conveyer so designed as to facilitate and expedite installation thereof.

Another object is to provide a conveyer which may be readily modified either during or after installation thereof to meet changed or new conditions.

Another object is to provide a conveyer having so-called end units for each section thereof, such units serving to support all intermediate parts of their respective sections and thus obviating the necessity for auxiliary supporting means.

Another object is to provide an end unit of such design that the same may be employed for all conveyer sections regardless of the angle of installation thereof.

Another object is to provide a conveyer comprising end units which may be individually installed as desired and upon which the other elements of the conveyer may thereafter be conveniently and expeditiously assembled.

Another object is to improve and simplify various other elements of the conveyer.

Another object is to provide a drive of greater flexibility than those heretofore employed and also auxiliary driving media for purposes hereinafter set forth.

Various other objects and advantages will hereinafter appear.

One embodiment of the invention is disclosed in the accompanying drawings and the same will now be described, it being understood that the sections illustrated may be used in any preferred relation and may be modified in various respects without departing from the scope of the appended claims.

In the drawings,

Figures 1 and 2 illustrate diagrammatically one application of a conveyer embodying the invention.

Figs. 3 and 4 illustrate diagrammatically a drive for the conveyer shown in Figs. 1 and 2.

Fig. 5 is a side elevational view of the end units diagrammatically illustrated in Fig. 1, said figure also illustrating supports for the conveyer having an idler roller mounted thereon.

Fig. 6 is an end view of the unit and idler roller shown in Fig. 5.

Fig. 7 is a detail sectional view on line 7—7 of Fig. 6.

Fig. 8 is a sectional view of the rollers shown in Fig. 5.

Fig. 9 is a plan view of a helical section shown diagrammatically in Fig. 1, the rollers being omitted.

Fig. 10 is a side view of a supporting part for such helical section.

Fig. 11 is a plan view of a horizontal turn shown diagrammatically in Fig. 1.

Figs. 12 and 13 are sectional views on lines 12—12 and 13—13 respectively of Fig. 11.

Fig. 14 is a side elevational view partly in section of a delivery table shown diagrammatically in Fig. 1; and, Fig. 15 is a detail sectional view of certain of the parts shown in Fig. 14.

Referring to Fig. 1, the same diagrammatically illustrates one application of the conveyer which provides for delivery of the newspapers from a press to a delivery table $T^1$ located on the first floor above the press or to a delivery table $T^2$ located on the second floor above the press. The newspapers are carried upwardly from the usual press conveyer A by a vertical conveyer section B, thence horizontally by conveyer sections C and D suspended from the ceiling of the press room to a vertical conveyer section E which carries the newspapers to the first floor. As hereinafter set forth a switch SW is located at the upper end of conveyer section E, said switch providing for delivery of the newspapers to the delivery table $T^1$ or to a vertical conveyer section F. Conveyer section F is twisted through an angle of 90° and delivers the newspapers to a horizontal turn G located on the second floor. Horizontal turn G shifts the newspapers in a horizontal plane through an angle of 90° and the same are carried therefrom by a horizontal conveyer section H to delivery table $T^2$.

Conveyer sections B to F inclusive and H are each provided with two sets of helical spring belts 1 and 2 which carry the newspapers therebetween while in the horizontal turn G the newspapers are advanced by a plurality of roller elements 3. Belts 1 and 2 of the various belt conveyer sections pass over grooved driving rollers located at opposite ends thereof said rollers being mounted in supporting frames $S^1$ to $S^{10}$ inclusive. Each of said supporting frames as hereinafter set forth is provided with a pair of square end plates which carry the driving rollers therebetween, said plates being designed to accommodate four driving rollers in bearings located on the diagonals thereof and equidistant from their centers. To facilitate description of the conveyer in the supporting frames the driving rollers in the upper left hand and upper right hand bearings will be hereinafter referred to by reference characters $R^1$ and $R^2$ respectively while the driving rollers in the lower left hand and lower right hand bearings will be referred to by reference characters $R^3$ and $R^4$ respectively. The various conveyer sections are also provided with idler rollers IR, said rollers serving to support belts 2 in the horizontal conveyer sections to prevent sagging thereof and also serving to press the adjacent sides of the belts 1 and 2 of the various sections together to insure gripping of the newspapers therebetween.

More specifically, supporting frame $S^1$ is provided with a driving roller $R^3$ for conveyer A and with driving rollers $R^1$ and $R^2$ for the lower ends of belts 1 and 2 respectively of conveyer section B and a set of deflector belts 4 passing over rollers $R^2$ and $R^3$ serves to carry the newspapers from conveyer A to the belts of conveyer B. Supporting frame $S^2$ is provided with driving rollers $R^3$ and $R^2$ for the belts 1 of conveyer sections B and C respectively, and with a driving roller $R^4$ for belts 2 of said sections and the newspapers are deflected from the belts of the former section to the belts of the latter by a set of belts 4 passing over rollers $R^2$ and $R^3$. The adjacent ends of the belts 1 of conveyer sections C and D pass over a driving roller $R^1$ in frame $S^3$ while the adjacent ends of the belts 2 of said sections pass over a driving roller $R^4$ in said frame. Supporting frame $S^4$ is provided with driving rollers $R^3$ and $R^2$ for the belts 2 of conveyer sections D and E respectively and with a driving roller $R^1$ for the belts 1 of said sections and the newspapers are deflected from the belts of the former section to the belts of the latter by a set of belts 4 passing over rollers $R^2$ and $R^3$. The upper ends of the belts 1 and 2 of conveyer section E pass over rollers $R^3$ and $R^4$ respectively in supporting frame $S^5$. As before stated a switch SW is located at the upper end of conveyer section E which provides for delivery of the newspapers to delivery table $T^1$ or to the lower end of conveyer section F. Switch SW is carried by supporting frame $S^6$ which is arranged to the right of frame $S^5$ and as hereinafter set forth said switch comprises a pivoted element mounted on the shaft of a driving roller $R^1$ in the former frame. Switch SW is movable between the positions indicated in full and dotted lines and when the same is located in its dotted line position the newspapers are carried to delivery table $T^1$ by a set of spring belts 5 passing over driving roller $R^4$ in supporting frame $S^5$. The lower ends of belts 1 and 2 of conveyer section F pass over rollers $R^3$ and $R^2$ respectively in supporting frame $S^7$. Frame $S^7$ is mounted directly above supporting frame $S^6$ and the roller $R^3$ thereof is connected to roller $R^3$ of supporting frame $S^5$ by a set of spring belts 6, while roller $R^2$ of said frame is connected to roller $R^1$ of frame $S^6$ by a set of belts 7. When switch SW is in its full line position the newspapers move upwardly over said switch and are carried between belts 6 and 7 to the belts of conveyer section F. Supporting frame $S^8$ is arranged at right angles to frame $S^7$ and as shown in Fig. 2 the same is provided with driving rollers $R^3$ and $R^4$ for belts 1 and 2 respectively of conveyer section F. Frame $S^8$ is also provided with a driving roller $R^2$ which is connected to roller $R^3$ by a set of belts 4 for deflecting the newspapers from the belts of conveyer section F to roller elements 3 of horizontal turn G. The right hand ends of the belts 1 and 2 of conveyer section H pass over driving rollers $R^1$ and $R^4$ respectively in frame $S^9$. The left hand end of belt 1 of conveyer section H passes over a roller $R^1$ in frame $S^{10}$ and the left hand end of the belt 2 of said section passes over an idler roller mounted to the left of said frame.

Referring to Figs. 3 and 4 the same illustrate diagrammatically driving means for the aforedescribed conveyer. The conveyer is driven from a shaft 10 having a sliding jaw coupling member 11 mounted thereon, said coupling member being movable towards the left into engagement with a cooperating jaw coupling member 12 which is driven from the press and being movable towards the right into engagement with a cooperating jaw coupling member 13 driven by a motor 14. Certain of the driving rollers of each of the various conveyer sections are driven by a rope belt 15 passing over a sheave 16 secured to shaft 10. Shaft 10 is driven in a clockwise direction when viewed from the left hand end thereof and the rope belt 15 passes from the left side of sheave 16 over an idler sheave 17 mounted on the ceiling of the press room, under an idler sheave 18 secured to a counterweight 19 and thence upwardly to the left hand end of conveyer section H. The rope belt then travels over sheaves fixed to the shafts of certain of the driving rollers carried by the various supporting frames and returns to the underside of sheave 16.

At the lower end of conveyer section B rope belt 15 travels from right to left under a sheave fixed to roller $R^2$ and over a sheave fixed to roller $R^1$ to drive said rollers in the direction for upward movement of the adjacent side of the belts 1 and 2. Between conveyer sections B and C the rope belt travels from right to left over sheaves fixed to rollers $R^2$ and $R^3$ to drive the right side of belts 1 of conveyer section B and the right side of deflector belts 4 upwardly. Between conveyer sections C and D the rope belt travels from right to left under a sheave fixed to roller $R^4$ and over the sheave fixed to roller $R^1$ to drive the adjacent sides of belts 1 and 2 of conveyer sections C and D towards the right. Between conveyer sections D and E the rope belt passes downwardly over the right hand side of a sheave fixed to roller $R^2$ and then towards the left under a sheave fixed to roller $R^3$ thus driving the upper side of belt 2 of section D towards the right and the left side of the belt 2 of conveyer section E upwardly. At the upper end of conveyer section E the rope belt travels from right to left under a sheave fixed to roller $R^4$ and over a sheave fixed to roller $R^3$ to drive the adjacent sides of belts 1 and 2 of said section upwardly. At the lower end of conveyer section F the rope belt travels from right to left under a sheave fixed to roller $R^2$ and over a sheave fixed to roller $R^3$ to drive the adjacent sides of the belts of said section upwardly. As shown in Fig. 4, at the upper end of conveyer section F the rope belt travels from right to left over sheaves fixed to rollers $R^2$ and $R^3$ to drive the right side of belts 1 and 4 upwardly. At the right hand end of conveyer section H the rope belt passes from left to right over a sheave fixed to roller $R^1$ and under a sheave fixed to roller $R^4$ to drive the adjacent sides of belts 1 and 2 of said section towards the left. At the left hand end of conveyer section H the rope belt passes from left to right over a sheave fixed to roller $R^1$ to drive the under side of belt 1 of said section towards the left. The rope belt also travels upwardly over the right hand side of a sheave fixed to a shaft in the lower left hand bearings of supporting frame $S^{10}$, said shaft serving as hereinafter set forth to drive the delivery table $T^2$.

While the aforedescribed rope belt is not arranged to drive all of the end rollers of the various conveyer sections, it is apparent that the same can be arranged to do so if desired. However, it has been found desirable to provide auxiliary driving means for the conveyer for a purpose hereinafter set forth and where such auxiliary driving means is employed the rope drive is preferably arranged as shown.

The auxiliary driving means includes chain and sprocket drives 20 to 24 inclusive. Drive 20 includes sprockets fixed to the shafts of each of the rollers carried by supporting frame $S^1$ and a chain belt arranged as shown for connecting said sprockets to a driving sprocket 25 fixed to shaft 11. Upon clockwise rotation of sprocket 25 the chain belt of drive 20 co-operates with the rope belt in driving rollers $R^1$ and $R^2$ in the proper direction and also drives roller $R^3$ for movement of the upper side of conveyer A towards the right. Drive 21 comprises sprockets fixed to the shafts of the rollers carried by supporting frame $S^2$ and a chain belt arranged as shown for driving roller $R^4$ in the required direction from rollers $R^2$ and $R^3$. Drive 22 includes sprockets fixed to the shafts of each of the rollers in supporting frame $S^4$ and a chain belt arranged as shown for driving roller $R^1$ in the required direction from rollers $R^3$ and $R^4$. Drive 23 includes a chain belt which connects sprockets fixed to rollers $R^2$ and $R^3$ in supporting frame $S^7$ with a sprocket fixed to roller $R^4$ in supporting frame $S^5$ to insure against speed variations between said rollers. Said chain belt also passes around the left hand side of a sprocket fixed to a roller $R^2$ in supporting frame $S^6$ and around the right hand side of a sprocket fixed to a shaft mounted in the lower right hand bearings of supporting frame $S^6$, and as hereinafter set forth the latter sprocket serves to drive the delivery table $T^1$. Drive 24 comprises sprockets secured to the shafts of each of the rollers in supporting frame $S^8$ and a chain belt arranged as shown for driving roller $R^4$ from rollers $R^2$ and $R^3$.

In connection with the foregoing it should be noted that the auxiliary drive provides means for driving the conveyer upon failure of the rope drive. Upon failure of the rope drive the chain and sprocket drive 20 acts to drive the various conveyer sections, the belts of each section being then driven at their receiving end by the belts of the adjacent section. Furthermore it should be noted that the various chain and sprocket drives serve to prevent speed variations between the belts of the various conveyer sections.

Referring to Figs. 5 to 7 inclusive the same show a mechanical embodiment of the supporting frames and rollers diagrammatically illustrated in Fig. 1. As before stated each of the supporting frames includes a pair of square end plates which carry the driving rollers therebetween and as shown each of said end plates comprises a casting 30 having an outwardly extending flange 31 extending around the periphery thereof. End plates 30 are provided with bored lugs at the corners thereof to receive spacing members 32, said members being provided with shoulders adjacent opposite ends thereof and being secured to the end plates by nuts 33. End plates 30 are also provided with outwardly extending tubular projections 34, (Fig. 7) for receiving shafts 35 of the driving rollers said projections being arranged equidistantly from the centers of the frames and on the diagonals thereof. Shafts 35 are supported within projections 34 by ball bearings 36 and as shown in Fig. 7 said projections are counterbored at 37 to receive the ball bearings and have cap members 38 secured thereto to hold the ball bearings in place. Shafts 35 are formed from square bars for a purpose hereinafter set forth and the end portions thereof are turned down to fit within the ball bearings 36.

Each of the end plates 30 has its inner face provided with four channels 39 for receiving pipe supports 40 and as shown in Fig. 6, said channels extend outwardly from the center of the plates and at right angles to the sides thereof. Said plates are provided with holes for receiving U-shaped pipe clamping members 41. and the holes are so arranged that two U-bolts can be provided for securing the pipe supports 40 in each of said channels. Pipe supports 40 are used to secure the supporting frames to the supporting structure and can be arranged as desired to suit the conditions of the installation. Also as hereinafter set forth said pipe supports are used in the various conveyer sections to support the idler rollers IR.

The drive shafts of the various rollers project outwardly from the supporting frames as shown at the left hand side of Fig. 5 and the sheaves and sprockets are fixed to the projecting ends of said shafts and are covered by a housing 42. As shown in Fig. 6 plates 30 are each provided with four tapped holes 43 for receiving securing bolts 44 for said housing. Also as shown in Fig. 6 each of the end plates is provided with openings 45 through its flange 31 and with openings 46 adjacent its upper left hand and lower right hand corners for a purpose hereinafter set forth.

The driving rollers and idler rollers are of like construction, the same comprising a rolled sheet metal part having a multiplicity of belt grooves formed therein, and end caps 47 fitting within opposite ends thereof. Caps 47 are formed to provide a shouldered portion 48 which fits within the roller part and is secured thereto by spot welding. Said caps are also provided with a square center opening and have a recess 49 formed therein for receiving a ball bearing 50 as shown at the right hand end of the upper roller in Fig. 5. The driving rollers are mounted on the square shafts 35 and the end caps of said rollers fit said shafts to prevent rotation of the rollers thereon. The driving rollers are also secured against axial movement on shafts 35 by tubular members 51 mounted on said shafts and arranged between opposite ends of the driving rollers and end plates 30. Each of the idler rollers is provided with a ball bearing 50 on opposite ends thereof and is rotatable on a shaft 52 passing through said bearings. The shafts of the idler rollers are supported at opposite ends by duplicate brackets 53 which are adapted for securement to the pipe supports 40 by U-shaped clamping members 41 which are the same as those used to secure said pipe supports to end plates 30. As shown in Fig. 6, brackets 53 are provided with a projecting arm 54, said arm being provided with slotted opening 55 for receiving shaft 52. The shafts of the idler rollers are secured to their brackets by nuts 56 and are adjustable between the positions indicated in full and dotted lines in Fig. 6.

Referring to Figs. 9 and 10 the same illustrate pipe supporting members 60 which are used in the twisted conveyer section F illustrated in Fig. 1. Said pipe supporting members are bent to form a helix and as shown in Fig. 9 the same extend through an angle of 90° on a radius equal to one-half the distance between the pipe supports when the same are mounted in a supporting frame. In manufacturing the members 60 the same are made of unit length and if the twist in the conveyer section is more than 90°, helical supporting members of suitable length can be coupled together while for twisted sections of less than 90° the helical members can be shortened. Also when the distance between the end frames of the twisted conveyer sections is greater than the length of the helical pipe sections straight pipe sections can be coupled thereto as shown in Fig. 10.

Referring to Figs. 11, 12 and 13 the same illustrate a mechanical embodiment of the horizontal turn G. As before stated the horizontal turn G comprises a plurality of roller elements 3 and as shown in Fig. 11, said roller elements have their axes arranged radially with respect to a center indicated by intersecting lines O. Roller elements 3 are supported between curved supporting plates 65 and 66, said supporting plates being arranged concentric to the center O and being supported on opposite ends by brackets 67 which are secured to frames $S^8$ and $S^9$ by bolts passing through certain of the openings 45 in end plates 30. Each of the roller elements 3 comprises a plurality of discs 68 secured to a drive shaft 69, said discs being arranged with their upper surfaces in a horizontal plane and being of varying diameter so that when the same are driven at a uniform speed the newspapers advance with their front edges radial with respect to the center O. The inner ends of the drive shafts 69 are supported by bearing members 70 each of said bearing members fitting within an opening in supporting plate 65 as shown in Fig. 12. The outer ends of drive shafts 69 are supported by brackets 71 secured to the inner face of supporting plate 66, one of said brackets being shown in section in Fig. 12.

The various roller elements are driven from the shafts of rollers $R^4$ in supporting frames $S^8$ and $S^9$. As shown in Fig. 11 the shafts 69 of the extreme roller elements have sprockets 72 fixed thereto which are connected to sprockets 73 mounted on the shafts of the driving rollers $R^4$, by chains 74. To provide a drive for all of the intermediate roller elements, each of the shafts 69 has a gear 76 fixed thereto and the gears of each of the intermediate shafts are connected to the gears of the shafts on opposite sides thereof by idler gears 77 each of which is fixed to a pin 78 which is rotatable within bracket members 79 secured to opposite sides of supporting member 66. Rope belt 15 passes around the outside of supporting member 66, the same being carried on idler sheaves 80 rotatably mounted in brackets 81 secured to the outer face of said member.

A mechanical embodiment of the delivery table $T^1$ is shown in Fig. 14. As before stated the delivery table $T^1$ is carried by supporting frame $S^6$. Each of the end plates 30 of said frame has a downwardly projecting bracket 82 secured to the lower right hand corner thereof, said brackets being secured to said plates by bolts passing through openings 45 of the latter. Brackets 82 carry at the lower end thereof, a driving roller 83 and the left hand end of the belts of table $T^1$ pass over said driving roller while the right hand ends of said belts pass over a roller 84 carried by a bracket 85. Bracket 85 is mounted at the right hand end of a pair of pipes supporting members 86, the left hand end of said pipe supporting members having brackets 87 secured thereto which are pivoted to a shaft 88 mounted between brackets 82. Pipe supporting members 86 each have a supporting member $86^a$ pivotally secured thereto for holding the delivery table $T^1$ in a horizontal position and said table when not in use can be swung upwardly about the shaft 88 to a vertical position.

Driving roller 83 is driven through gearing from shaft 88 and said shaft is driven from the shaft in the lower right hand bearing in supporting frame $S^6$ by a chain and sprocket drive 89. As set forth in connection with Fig. 3, the shaft in the lower right hand bearing of frame $S^6$ is driven by the chain belt of drive 23 and it is apparent from the drawing that the same acts through drive 89 to drive the upper side of the belts of table $T^1$ towards the right. However, it is necessary to drive the belts of table $T^1$ at a reduced speed to provide for stacking of the newspapers when the same are delivered thereon and for this purpose the driving sprocket of drive 89 is of smaller diameter than the driven sprocket thereof. As before stated the newspapers are carried from the upper end of conveyer section E to the delivery table $T^1$ by a set of spring belts 5 passing over roller $R^4$ in frame $S^5$ and the right hand end of said belts pass over a roller 90 mounted in bracket 82. As the newspapers pass over roller 90 the same are held thereagainst by a roller 91. Roller 91 is connected to roller $R^2$ in frame $S^6$ by a set of spring belts 92 and the same is mounted between the free ends of links 93 which are pivotally secured to the end plates 30 of said frame by bolts passing through the openings 46 in said plates. Upon delivery of the newspapers between rollers 90 and 91 the same drop downwardly between shields 94 and 95, the former being fixed and the latter being pivoted on the upper right hand spacing member 32 of frame $S^6$.

Switch SW is pivotally mounted on the shaft of roller $R^1$ in frame $S^6$ and the same includes a supporting bracket 97 pivoted on said shaft and having a V shaped sheet metal member 98 secured thereto. Members 97 and 98 are movable between the positions shown in full and dotted lines by an operating handle 99 shown in dotted lines in Fig. 14 and a spring pressure device 100 is provided for maintaining the same in such positions. Said spring pressure device as shown in Fig. 15 includes a pin 101 having a compression spring 102 mounted thereon. Pin 101 has an enlarged head 103 provided with a recess for receiving the spacing member 32 at the upper left hand corner of frame $S^6$ and the same is slotted to receive a pin 104 fixed to an upwardly projecting arm 105 on bracket 97. Spring 102 is interposed between head 103 of pin 101 and a washer 106 slidable on said pin and bearing on the end of arm 105. Arm 105 is so arranged that the same tends to move in a clockwise direction under the action of spring 102 when the switch SW is in its full line position and in a counterclockwise direction under the action of said spring when said switch is moved to its dotted line position. Spring pressure device 100 thus serves to hold the switch against accidental displacement.

It is desirable to provide additional pressure on the newspapers as the same pass upwardly over member 98 of switch SW and for this purpose a set of floating idler rollers 107 are provided for pressing the belts 6 towards said member. Rollers 107 are rotatably mounted between the free ends of members 108 pivoted on the shaft of roller $R^3$ in supporting frame $S^7$. Members 108 are held in the proper position by links 109 having their left hand ends pivoted to said members and their right hand ends pivoted to bracket 97. Links 109 also coöperate with projecting lugs 110 and 111 on bracket 97 to limit movement of the switch in opposite directions under the action of spring pressure device 100.

Delivery table $T^2$ is the same as delivery table $T^1$, the switch being omitted. The lower belts 2 of section H pass over roller 90 while the chain and sprocket drive 89 is driven from the shaft in the lower left hand bearing of supporting frame $S^{10}$. As set forth in connection with Fig. 3 said shaft is provided with a sheave driven by rope belt 15.

What we claim as new and desire to secure by Letters Patent is:

1. In a conveyer, in combination, a plurality of endless belts, certain of the same being arranged horizontally and others vertically, rollers on which said belts are mounted to provide a plurality of conveyer sections and supporting frames for said rollers, said frames being of like construction and each being adapted to accommodate a plurality of rollers in positions disposed symmetrically about a common axis.

2. In a conveyer, in combination, a plurality of endless belts, certain of the same being arranged horizontally and others vertically, rollers on which said belts are mounted to provide a plurality of conveyer sections and supporting frames for said rollers, said frames being of like construction and each being adapted to accommodate four driving rollers in bearings arranged symmetrically about a common axis.

3. In a conveyer, in combination, a plurality of endless belts, rollers on which said belts are mounted to provide a plurality of conveyer sections, supporting frames for said rollers and pipe supporting members between said frames, said frames being of like construction and each being adapted to accommodate a plurality of rollers and a plurality of supporting members in positions disposed symmetrically about a common axis.

4. In a conveyer, in combination, a plurality of endless belts, rollers on which said belts are mounted to provide a plurality of conveyer sections supporting frames for said rollers, said frames being of like construction and being arranged to accommodate a plurality of rollers in bearings disposed symmetrically about a common axis, a delivery table supported by one of said frames and driving means for said table including a drive shaft mounted in certain of the bearings of said latter frame.

5. In a conveyer, in combination, a plurality of endless belts, rollers on which said belts are mounted to provide a plurality of conveyer sections, supporting frames for said rollers, said frames being of like construction and each being adapted to accommodate a plurality of rollers in bearings disposed symmetrically about a common axis, a delivery table carried by one of said frames, an endless rope belt constituting a driving medium for said sections, and means driven by said rope belt for driving said table.

6. In a conveyer, in combination, a plurality of endless belts, driving rollers on which said belts are mounted to provide a plurality of conveyer sections, supporting frames for said rollers, said frames being of like construction and each being adapted to accommodate a plurality of rollers in bearings disposed symmetrically about a common axis, a delivery table adjacent certain intermediate sections, a supporting frame for said table of the same construction as said former frames, and a movable switch element carried by said latter frame and providing for delivery of the articles carried by said conveyer to said delivery table or for shunting said table.

7. In a conveyer, in combination, a plurality of endless belts, rollers on which said belts are mounted to provide a plurality of conveyer sections, supporting frames for said rollers, said frames being of like construction and each being adapted to accommodate a plurality of rollers, and a horizontal turn between certain of said conveyer sections, said turn including a series of tapered roller elements bridging the adjacent frames of said latter sections and having their axes arranged radially with respect to a common center.

8. In a conveyer, in combination, conveyer sections arranged substantially at an angle and each including sets of endless conveyer belts, driving rollers for said belts, supporting frames for said rollers, said frames being of like construction, a horizontal turn between the adjacent frames of said conveyer sections, said turn including a series of tapered roller elements supported by and bridging said latter frames, said roller elements having their axes arranged radially with respect to a common center and being driven from certain of the rollers in said latter frames.

9. In a conveyer, in combination, two roller supporting frames of like construction arranged in an angular relation in a horizontal plane, each of said frames being adapted to accommodate a plurality of driving rollers, endless conveyer belts passing over the driving rollers in each of said frames, a series of tapered roller elements disposed radially about a point located between said frames, means for driving the extreme elements of said series from certain of the rollers in said frames, and gearing connecting the extreme elements to the intermediate elements of said series to drive the latter.

10. In a conveyer, in combination, two supporting frames of like construction arranged at an angle to each other in a horizontal plane, each of said frames being adapted to accommodate a plurality of driving rollers in positions disposed symmetrically about a common axis, endless conveyer belts passing over certain of the rollers in each of said frames, a series of tapered roller elements arranged between said frames and disposed radially with respect to a common point, chain and sprocket drives connecting the extreme elements of said series to certain of the rollers of said frames, gearing for connecting the extreme elements of said series to the intermediate elements thereof and an endless rope belt constituting a driving medium for certain of the rollers of each of said frames.

11. In a conveyer, in combination, a plurality of endless belts, rollers on which said belts are mounted to provide a plurality of conveyer sections and an endless rope constituting a driving medium for certain of the rollers of each of said sections.

12. In a conveyer, in combination, a plurality of endless belts, rollers on which said belts are mounted, certain of said belts being arranged in a parallel and closely adjacent relation to grip material therebetween and an endless rope constituting a driving medium for certain rollers of each of said belts and providing for unidirectional movement of the adjacent portions of said parallel belts.

13. In a conveyer, in combination, a plurality of endless belts, rollers on which said belts are mounted to provide a plurality of conveyer sections, certain of said sections comprising belts mounted in a parallel relation with portions thereof closely adjacent to grip material therebetween and an endless rope constituting a driving medium for certain of the rollers of each of said sections and providing for unidirectional movement of the adjacent portions of said parallel belts.

14. In a conveyer, in combination, a plurality of endless belts, driving rollers on which said belts are mounted, certain of said rollers having their axes extending in different directions and an endless belt for directly driving at least one roller of each of said first-mentioned endless belts.

15. In a conveyer, in combination, a plurality of endless belts, driving rollers on which said belts are mounted to provide a plurality of conveyer sections including a section having driving rollers so disposed that their axes extend in different directions and an endless rope providing a driving medium for the rollers of each of said sections.

16. In a conveyer, in combination, a plurality of endless belt conveyer sections having driving rollers, an endless rope for driving certain of the rollers of each of said sections and auxiliary driving connections between certain of said rollers.

17. In a conveyer, in combination, a plurality of endless belt conveyer sections having driving rollers, an endless rope for driving certain of the rollers of each of said sections and auxiliary driving connections between certain rollers of adjacent sections.

18. A roller supporting frame for conveyors comprising square end plates each having four shaft bearings arranged symmetrically about a given point and each having four grooves in one of the faces thereof to accommodate pipe supporting members between adjacent bearings.

19. A roller supporting frame for conveyers comprising square end plates and a plurality of spacer rods extending between said plates and secured to the corners thereof, said plates being of like construction and each of the same having four shaft bearings arranged symmetrically about a common point and having one of the faces thereof provided with a plurality of grooves to receive pipe supporting members.

20. A roller supporting frame comprising a pair of square end plates, a plurality of rods extending through openings in the corners of said end plates for securing the same together in a spaced relation, each of said end plates having four shaft bearings arranged symmetrically about the center thereof and each having four grooves radiating from and symmetrically disposed about such point, said grooves affording a bearing for a plurality of pipe supporting members and said plates being provided with openings on opposite sides of said grooves for the reception of U-shaped clamping members.

21. A conveyer comprising a frame, a plurality of like shafts supported thereby and a plurality of like rollers removably mounted on said shafts, said rollers having belt grooves therein and said shafts having means to insure like positioning of said rollers thereon for alignment of the grooves in said rollers.

22. A conveyer comprising a frame, a plurality of shafts supported thereby and a plurality of like rollers removably mounted on said shafts, said rollers each having a plurality of belt grooves arranged to align with the grooves of another roller upon axial reversals of either and said shafts having means to insure like positioning of said rollers thereon.

23. A conveyer comprising a plurality of endless belts, rollers on which said belts are mounted to provide a plurality of conveyer sections, certain of said sections having parallel belts to grip the material therebetween and like frames each to support the end rollers of adjacent sections and each having a plurality of sets of bearings for its rollers arranged symmetrically with respect to the longitudinal axis of such frame whereby adjacent conveyer sections may be arranged in a straight line or angularly and whereby the rollers may be mounted in the same relation when the frame occupies any one of a number of positions obtained by rotation thereof about its longitudinal axis.

24. A conveyer section comprising endless belts, rollers on which said belts are mounted in a parallel relation with adjacent portions to grip material therebetween like frames for supporting adjacent end rollers of said belts, connecting members for said frames, and means for securing each of said frames to said connecting members when the former occupies any one of a number of positions rotarily of its longitudinal axis, each of said frames having a plurality of sets of bearings for said rollers whereby like positioning of said rollers may be obtained in any of such positions thereof.

25. A conveyer comprising a plurality of endless belts, rollers for supporting the same to provide a plurality of conveyer sections, certain of the same having parallel belts with closely adjacent portions to grip material therebetween, a plurality of like frames each to support the end rollers of adjacent sections and connecting members for said frames, each of said frames having means for securing the same to connecting members arranged rectilinearly or at right angles and having a plurality of sets of bearings for its rollers arranged symmetrically about its longitudinal axis.

26. A conveyer section comprising belts, rollers to support the same and a pair of supporting members for said rollers, said members supporting certain of said rollers whereby the lines of contact between the latter and said belts constitute elements of a substantially helical surface, each of said members comprising a helically curved section having a definite helical pitch and a supplemental section whereby said members may be made of a given length with a varying number of degrees of helical curvature by varying the relative lengths of said sections.

27. A conveyer section comprising belts, rollers to support the same, a pair of supporting members for said rollers, said members supporting certain of said rollers whereby the lines of contact between the latter and said belts constitute elements of a substantially helical surface, each of said members comprising a length of helically curved stock having a given helical pitch, a length of straight stock and means for securing the same together in an end to end relation.

28. In a conveyer, a plurality of endless belts, rollers on which said belts are mounted to provide a plurality of conveyer sections, supporting frames for said rollers, said frames being adapted to accommodate a plurality of rollers in bearings disposed symmetrically about a common axis and a switch element carried by one of said frames, and providing for delivery of the articles carried by one of said conveyer sections to certain other of said conveyer sections selectively.

29. A roller supporting frame for conveyers comprising end plates each having a plurality of shaft bearings arranged symmetrically about a given point and each having a plurality of grooves in one face thereof to receive supporting members.

In witness whereof, we have hereunto subscribed our names.

GUSTAVE B. REISBACH.
HARRY A. SEDGWICK.